United States Patent
Ruckdäschel et al.

(10) Patent No.: US 10,543,664 B2
(45) Date of Patent: Jan. 28, 2020

(54) FIBER-REINFORCEMENT OF BLOWING-AGENT CONTAINING FOAM MATERIALS

(71) Applicant: BASF SE, Ludwigshafen (DE)

(72) Inventors: Holger Ruckdäschel, St. Martin (DE); Rene Arbter, Freinsheim (DE); Robert Stein, Altrip (DE); Daniela Longo-Schedel, Sankt Augustin (DE); Tim Diehlmann, Obrigheim-Colgenstein (DE); Bangaru Sampath, Ludwigshafen (DE); Peter Gutmann, Karlsruhe (DE); Alexandre Terrenoire, Ludwigshafen (DE); Markus Hartenstein, Rülzheim (DE); Andreas Kirgis, Mannheim (DE); Alessio Morino, Castagneto Po (IT); Gregor Daun, Neckargemünd (DE); Marc Claude Martin, Lemförde (DE); Peter Merkel, Zellertal (DE); Thomas Kiciak, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 13 days.

(21) Appl. No.: 15/538,704

(22) PCT Filed: Dec. 15, 2015

(86) PCT No.: PCT/EP2015/079806
§ 371 (c)(1),
(2) Date: Jun. 22, 2017

(87) PCT Pub. No.: WO2016/102245
PCT Pub. Date: Jun. 30, 2016

(65) Prior Publication Data
US 2018/0257345 A1    Sep. 13, 2018

(30) Foreign Application Priority Data

Dec. 22, 2014  (EP) ...................... 14199631

(51) Int. Cl.
*B32B 27/06*    (2006.01)
*C08J 9/00*    (2006.01)
(Continued)

(52) U.S. Cl.
CPC .......... *B32B 27/065* (2013.01); *B29C 44/505* (2016.11); *B32B 5/08* (2013.01);
(Continued)

(58) Field of Classification Search
CPC ............. E04C 2/205; Y10T 428/23914; Y10T 428/23979; Y10T 428/249962;
(Continued)

(56) References Cited

U.S. PATENT DOCUMENTS 3,030,256 A    4/1962    Rosenthal
6,767,623 B1   7/2004    Mock et al.
(Continued)

FOREIGN PATENT DOCUMENTS

DE    4421016 A1    12/1995
EP    0602262 A1    6/1994
(Continued)

OTHER PUBLICATIONS

English Translation of the International Preliminary Report on Patentability for PCT/EP2015/079805 dated Apr. 26, 2017.
(Continued)

*Primary Examiner* — Camie S Thompson
(74) *Attorney, Agent, or Firm* — Drinker Biddle & Reath LLP

(57) ABSTRACT

The present invention relates to a process for producing a molding made from blowing agent-containing foam com-
(Continued)

prising at least one fiber (F), wherein the at least one fiber (F) is partially introduced into the blowing agent-containing foam. The two ends of the respective fiber (F) that are not surrounded by the blowing agent-containing foam thus project from one side of the corresponding molding. The present invention also provides the molding as such. The present invention further provides a panel comprising at least one such molding, produced by the process according to the invention, and at least one further layer (S1). The present invention also provides for the production of the panels of the invention and for the use thereof, for example as a rotor blade in wind turbines.

19 Claims, 2 Drawing Sheets

(51) Int. Cl.
    *C08J 9/14*         (2006.01)
    *B29C 44/50*      (2006.01)
    *B32B 5/08*        (2006.01)
    *B32B 5/24*        (2006.01)
    *B29K 105/04*     (2006.01)

(52) U.S. Cl.
    CPC ............ *B32B 5/245* (2013.01); *C08J 9/0061* (2013.01); *C08J 9/14* (2013.01); *B29K 2105/04* (2013.01); *C08J 2300/22* (2013.01); *C08J 2300/26* (2013.01)

(58) Field of Classification Search
    CPC . B29C 44/352; B29C 44/569; B29C 44/3446; B29C 44/505; B29C 48/90; B29K 2105/04; B29K 2025/06; B29K 2067/003; B29K 2105/046; B29K 2105/12; B29L 2009/00; B29L 2031/08; B32B 2260/021; B32B 2260/046; B32B 2262/101; B32B 2262/103; B32B 2262/105; B32B 2262/106; B32B 2262/14; B32B 2266/08; B32B 2307/542; B32B 2307/546; B32B 2603/00; B32B 27/06; B32B 5/08; B32B 5/18; B32B 5/20; B32B 5/245; B32B 2262/065; B32B 2266/0214; B32B 2266/0228; B32B 2266/025; B32B 2266/0264; B32B 2266/0292; B32B 2307/718; B32B 2307/72; C08J 2201/03; C08J 2207/00; C08J 2300/22; C08J 2325/08; C08J 9/149; C08J 9/127; C08J 9/0085; C08J 2325/06; C08J 2325/12; C08J 2325/14; C08J 2323/06; C08J 2323/12; C08J 5/043
    USPC ............ 156/148; 428/311.11, 86, 95, 96, 6, 428/317.9, 316.6, 74
    See application file for complete search history.

(56) References Cited

U.S. PATENT DOCUMENTS

| | | |
|---|---|---|
| 7,201,625 B2 | 4/2007 | Yeh |
| 2001/0031350 A1 | 10/2001 | Day et al. |
| 2007/0112082 A1 | 5/2007 | Hahn et al. |
| 2011/0082227 A1 | 4/2011 | Rueger et al. |
| 2012/0245286 A1 | 9/2012 | Younes |

FOREIGN PATENT DOCUMENTS

| | | |
|---|---|---|
| EP | 1213119 A2 | 6/2002 |
| EP | 1318164 A1 | 6/2003 |
| EP | 2420531 A1 | 2/2012 |
| EP | 2578381 A1 | 4/2013 |
| GB | 2455044 A | 6/2009 |
| WO | WO-2005056653 A1 | 6/2005 |
| WO | WO-2006125561 A1 | 11/2006 |
| WO | WO-2009047483 A1 | 4/2009 |
| WO | WO-2011012587 A1 | 2/2011 |
| WO | WO-2012020112 A1 | 2/2012 |
| WO | WO-2012134878 A2 | 10/2012 |
| WO | WO-2012138445 A1 | 10/2012 |
| WO | WO-2016102243 A1 | 6/2016 |
| WO | WO-2016102244 A1 | 6/2016 |
| WO | WO-2016102246 A1 | 6/2016 |

OTHER PUBLICATIONS

Fahnler, F., "Polyamide", in Kunststoff Handbuch (series), vol. 3/4, Hanser Fachbuch, 1998.
Habenicht, G., Kleben—Grundlagen, Technologien, Anwendung [Adhesive Bonding—Basics, Technology, Application], Springer-Verlag, Berlin, Heidelberg, 2002.
International Search Report for PCT/EP2015/079803 dated Feb. 23, 2016.
International Search Report for PCT/EP2015/079805 dated Feb. 3, 2016.
International Search Report for PCT/EP2015/079806 dated Feb. 3, 2016.
International Search Report for PCT/EP2015/079808 dated Feb. 3, 2016.
Parnas, R., Liquid Composite Molding, Carl Hanser Verlag GmbH & Co. KG, Munich, Germany, 2000.
Penczek, P., et al., Unsaturated Polyester Resins: Chemistry and Technology, pp. 1-95 in Crosslinking in Material Science, Advances in Polymer Science (series), vol. 184, Springer-Verlag, Berlin, Heidelberg, 2005.
Pham, H., et al., "Epoxy Resins", in Ullmann's Encyclopedia of Industrial Chemistry, vol. 13, Wiley-VCH, Weinheim, Germany, 2012.
Wiley Encyclopedia of Composites, 2nd ed., Niolais, L., et al. eds., John Wiley & Sons, Inc., Hoboken, New Jersey, 2012.
Williams, C., et al., "Resin Infusion under Flexible Tooling (RIFT): a review", Composites Part A: Applied Science and Manufacturing, vol. 27, No. 7, (1997), pp. 517-524.
Written Opinion of the International Searching Authority for PCT/EP2015/079803 dated Feb. 23, 2016.
Written Opinion of the International Searching Authority for PCT/EP2015/079805 dated Feb. 3, 2016.
Written Opinion of the International Searching Authority for PCT/EP2015/079806 dated Feb. 3, 2016.
Written Opinion of the International Searching Authority for PCT/EP2015/079808 dated Feb. 3, 2016.
International Preliminary Report on Patentability for International Application No. PCT/EP2015/079806, dated Jun. 22, 2017.

FIBER-REINFORCEMENT OF BLOWING-AGENT CONTAINING FOAM MATERIALS

CROSS-REFERENCE TO RELATED APPLICATIONS

This application is a national stage application (under 35 U.S.C. § 371) of PCT/EP2015/079806, filed Dec. 15, 2015, which claims benefit of European Application No. 14199631.4, filed Dec. 22, 2014, both of which are incorporated herein by reference in their entirety.

The present invention relates to a process for producing a molding made from blowing agent-containing foam comprising at least one fiber (F), wherein the at least one fiber (F) is partially introduced into the blowing agent-containing foam. The two ends of the respective fiber (F) that are not surrounded by the blowing agent-containing foam thus project from one side of the corresponding molding. The present invention also provides the molding as such. The present invention further provides a panel comprising at least one such molding, produced by the process according to the invention, and at least one further layer (S1). The present invention also provides for the production of the panels of the invention and for the use thereof, for example as a rotor blade in wind turbines.

WO 2006/125561 relates to a process for producing a reinforced cellular material, wherein at least one hole extending from a first surface to a second surface of the cellular material is produced in the cellular material in a first process step. On the other side of the second surface of the cellular material, at least one fiber bundle is provided, said fiber bundle being drawn with a needle through the hole to the first side of the cellular material. However, before the needle takes hold of the fiber bundle, the needle is first pulled through the particular hole coming from the first side of the cellular material. In addition, the fiber bundle on conclusion of the process according to WO 2006/125561 is partly within the cellular material, since it fills the corresponding hole, and the corresponding fiber bundle partly projects from the first and second surfaces of the cellular material on the respective sides.

By the process described in WO 2006/125561, it is possible to produce sandwich-like components comprising a core of said cellular material and at least one fiber bundle. Resin layers and fiber-reinforced resin layers may be applied to the surfaces of this core, in order to produce the actual sandwich-like component. Cellular materials used to form the core of the sandwich-like component may, for example, be polyvinyl chlorides or polyurethanes. Examples of useful fiber bundles include carbon fibers, nylon fibers, glass fibers or polyester fibers.

However, WO 2006/125561 does not disclose that the cellular material for production of a core in a sandwich-like component comprises blowing agent-containing foams. The sandwich-like components according to WO 2006/125561 are suitable for use in aircraft construction.

WO 2011/012587 relates to a further process for producing a core with integrated bridging fibers for panels made from composite materials. The core is produced by pulling the bridging fibers provided on a surface of what is called a "cake" made from lightweight material partly or completely through said cake with the aid of a needle. The "cake" may be formed from polyurethane foams, polyester foams, polyethylene terephthalate foams, polyvinyl chloride foams or a phenolic foam, especially from a polyurethane foam. The fibers used may in principle be any kind of single or multiple threads and other yarns.

The cores thus produced may in turn be part of a panel made from composite materials, wherein the core is surrounded on one or two sides by a resin matrix and combinations of resin matrices with fibers in a sandwich-like configuration. However, WO 2011/012587 does not disclose that blowing agent-containing foams can be used for production of the corresponding core material.

WO 2012/138445 relates to a process for producing a composite core panel using a multitude of longitudinal strips of a cellular material having a low density. A twin-layer fiber mat is introduced between the individual strips, and this brings about bonding of the individual strips, with use of resin, to form the composite core panels. The cellular material having a low density that forms longitudinal strips, according to WO 2012/138445, is selected from balsa wood, elastic foams and fiber-reinforced composite foams. The fiber mats introduced in twin-layer formed between the individual strips may, for example, be a porous glass fiber mat. The resin used as adhesive may, for example, be a polyester, an epoxy resin or a phenolic resin, or a heat-activated thermoplastic, for example polypropylene or PET. However, WO 2012/138445 does not disclose that individual fibers or fiber bundles can be incorporated into the cellular material for reinforcement. According to WO 2012/138445, exclusively fiber mats that additionally constitute a bonding element in the context of adhesive bonding of the individual strips by means of resin to obtain the core material are used for this purpose.

GB-A 2 455 044 discloses a process for producing a multilayer composite article, wherein, in a first process step, a multitude of beads of thermoplastic material and a blowing agent are provided. The thermoplastic material is a mixture of polystyrene (PS) and polyphenylene oxide (PPO) comprising at least 20% to 70% by weight of PPO. In a second process step the beads are expanded, and in a third process step they are welded in a mold to form a closed-cell foam of the thermoplastic material to give a molding, the closed-cell foam assuming the shape of the mold. In the next process step, a layer of fiber-reinforced material is applied to the surface of the closed-cell foam, the attachment of the respective surfaces being conducted using an epoxy resin. However, GB-A 2 455 044 does not disclose that a fiber material can be introduced into the core of the multilayer composite article.

An analogous process and an analogous multilayer composite article (to those in GB-A 2 455 044) is also disclosed in WO 2009/047483. These multilayer composite articles are suitable, for example, for use of rotor blades (in wind turbines) or as ship's hulls.

U.S. Pat. No. 7,201,625 discloses a process for producing foam products and the foam products as such, which can be used, for example, in the sports sector as a surfboard. The core of the foam product is formed by a molded foam, for example based on a polystyrene foam. This molded foam is produced in a special mold, with an outer plastic skin surrounding the molded foam. The outer plastic skin may, for example, be a polyethylene film. However, U.S. Pat. No. 7,201,625 also does not disclose that fibers for reinforcement of the material may be present in the molded foam.

U.S. Pat. No. 6,767,623 discloses sandwich panels having a core layer of molded polypropylene foam based on particles having a particle size in the range from 2 to 8 mm and a bulk density in the range from 10 to 100 g/L. In addition, the sandwich panels comprise two outer layers of fiber-reinforced polypropylene, with the individual outer layers arranged around the core so as to form a sandwich. Still further layers may optionally be present in the sandwich panels for decorative purposes. The outer layers may comprise glass fibers or other polymer fibers.

EP-A 2 420 531 discloses extruded foams based on a polymer such as polystyrene in which at least one mineral filler having a particle size of ≤10 μm and at least one nucleating agent are present. These extruded foams are notable for their improved stiffness. Additionally described is a corresponding extrusion process for producing such extruded foams based on polystyrene. The extruded foams may have closed cells. However, EP-A 2 480 531 does not state that the extruded foams comprise fibers.

WO 2005/056653 relates to molded foams formed from expandable polymer beads comprising filler. The molded foams are obtainable by welding prefoamed foam beads formed from expandable thermoplastic polymer beads comprising filler, the molded foam having a density in the range from 8 to 300 g/L. The thermoplastic polymer beads especially comprise a styrene polymer. The fillers used may be pulverulent inorganic substances, metal, chalk, aluminum hydroxide, calcium carbonate or alumina, or inorganic substances in the form of beads or fibers, such as glass beads, glass fibers or carbon fibers.

U.S. Pat. No. 3,030,256 relates to laminated panels which have been produced by using fibers to reinforce a core that has been produced from a foam or a polymer expanded with the aid of a blowing agent. Materials described for the core are expanded and extruded polystyrene, and also phenols, epoxides and polyurethanes. For introduction of the fibers, a needle is used to produce a hole from the first side of the core to the second side of the core, and the same needle is used to pull a fiber bundle through the hole from the second side to the first side, such that the fiber bundle is partly within the core and partly projects from the first and second sides. The fiber material is introduced into the core at an angle of 0° relative to the thickness direction of the core.

DETAILED DESCRIPTION OF THE INVENTION

Figure 1:
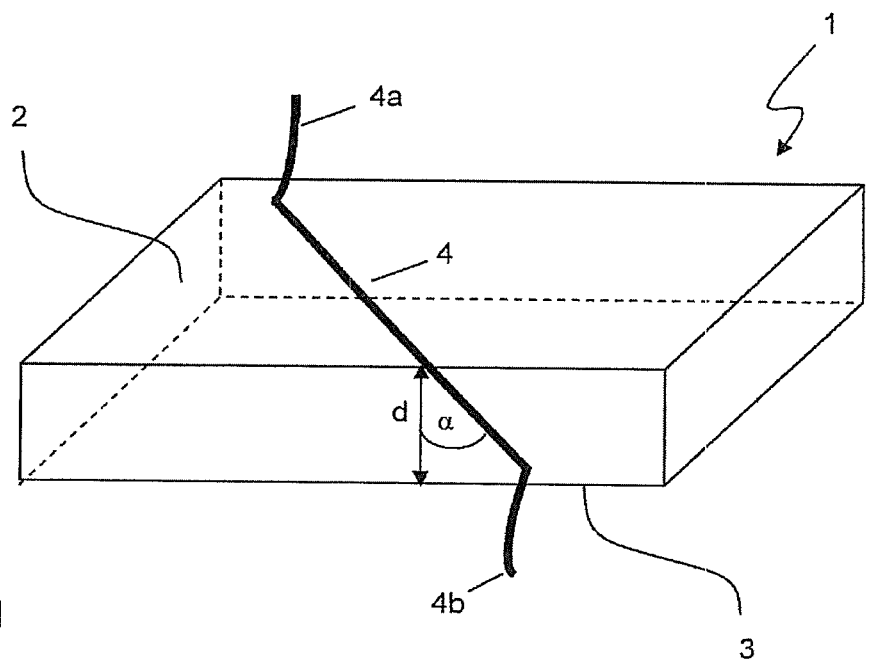
FIG. 1 shows a schematic diagram of an embodiment of the molding produced in accordance with the invention.

The object underlying the present invention is that of providing a novel process for producing fiber-reinforced moldings and of providing novel fiber-reinforced panels.

This object is achieved in accordance with the invention by a process for producing a molding comprising at least one fiber (F), wherein at least one fiber (F) is partially introduced into a molding made of blowing agent-containing foam in said blowing agent-containing foam, as a result of which the fiber (F) is present with a fiber region (2) within the molding and is surrounded by the blowing agent-containing foam, while a fiber region (FB1) of the fiber (F) projects out of a first side of the molding and a fiber region (FB3) of the fiber (F) projects out of a second side of the molding, where the molding comprises more than 1000 fibers (F) per m².

The present invention further provides a process for producing a molding comprising at least one fiber (F), wherein at least one fiber (F) is partially introduced into a molding made of blowing agent-containing foam in said blowing agent-containing foam, as a result of which the fiber (F) is present with a fiber region (FB2) within the molding and is surrounded by the blowing agent-containing foam, while a fiber region (FB1) of the fiber (F) projects out of a first side of the molding and a fiber region (FB3) of the fiber (F) projects out of a second side of the molding.

The details and preferences which follow apply to both embodiments of the process for producing the molding.

The process of the invention affords moldings having improved mechanical properties. Moreover, the process of the invention reduces the stabilization time for the blowing agent-containing foam. This is the case especially since the introduction of fibers (F) into the blowing agent-containing foam achieves more rapid exchange of blowing agent, especially more rapid exchange of gas, combined with more rapid exchange of heat with the environment. This distinctly reduces the storage time typically required for the blowing agent-containing foam after the production of the blowing agent-containing foam, specifically in the case of use of foam/blowing agent combinations where the blowing agent is gradually desorbed. The availability of a greater selection of blowing agents and blowing agent contents with simultaneously short stabilization times can thus optimize the production process for the foam, the resulting foam structure and the ripening time (time required for desorption of the blowing agent) independently of one another.

Advantageous effects are also achieved when the process of the invention is conducted as promptly as possible after the production of the blowing agent-containing foam. In that case, the blowing agent-containing foams have particularly low sewing resistances. Therefore, the sewing forces required are reduced, which distinctly reduces the wear on the needle used in a preferred embodiment of the process of the invention. In addition, the throughput can be increased. As a result of the exchange of heat and the exchange of blowing agent (blowing agent desorption), the blowing agent-containing foam additionally shrinks, as a result of which the fibers (F) are better fixed in the blowing agent-containing foam. There is therefore a significant rise in the pullout resistance of the fiber (F) in the molding produced in accordance with the invention.

The moldings produced in accordance with the invention also advantageously feature low resin absorption with simultaneously good interfacial binding. This effect is important especially when the moldings produced in accordance with the invention are being processed further to give the panels of the invention.

A further improvement in binding with simultaneously reduced resin absorption is enabled in accordance with the invention by the fiber reinforcement of the blowing agent-containing foams in the moldings produced in accordance with the invention or the panels that result therefrom. According to the invention, the fibers (individually or preferably in the form of fiber bundles) can advantageously be introduced into the blowing agent-containing foam at first in dry form and/or by mechanical processes. The fibers or fiber bundles are not laid down flush with the respective blowing agent-containing foam surfaces, but with an excess, and hence enable improved binding or direct connection to the corresponding outer plies in the panel of the invention. This is the case especially when the outer ply applied to the molding of the invention, in accordance with the invention, is at least one further layer (S1) to form a panel. Preference is given to applying two layers (S1), which may be the same or different. More preferably, two identical layers (S1), especially two identical fiber-reinforced resin layers, are applied to opposite sides of the molding produced in accordance with the invention to form a panel of the invention. Such panels are also referred to as "sandwich materials", in which case the molding produced in accordance with the invention can also be referred to as "core material".

The panels of the invention are thus notable for low resin absorption in conjunction with good peel strength. Moreover, high strength and stiffness properties can be established in a controlled manner via the choice of fiber types and the proportion and arrangement thereof. The effect of low resin absorption is important because a common aim in the case of use of such panels (sandwich materials) is that the structural properties should be increased with minimum weight. In the case of use of fiber-reinforced outer plies, for example, as well as the actual outer plies and the sandwich core, the resin absorption of the core material makes a contribution to the total weight. However, the moldings produced in accordance with the invention or the panels of the invention can reduce the resin absorption, which can save weight and costs.

A further advantage of the moldings or panels produced in accordance with the invention is considered to be that the use of blowing agent-containing foams and the associated production makes it relatively simple to incorporate integrated structures such as slots or holes on the surfaces of the moldings and to process the moldings further. In the case of use of such moldings (core materials), structures of this kind are frequently introduced, for example, into curved structures (deep slots) for draping, for improvement of processibility by liquid resin processes such as vacuum infusion (holes), and for acceleration of the processing operation mentioned (shallow slots).

For the production of the panels of the invention, it is also advantageous when the moldings have a minimum proportion of volatile constituents and specifically of blowing agents still present. The introduction of the fibers into the foam to obtain the molding can result in a very rapid and significant reduction in the amount of blowing agent locally at all sites which come into contact with the resin system. This reduces or prevents defects in the laminate as a result of inclusions of gas or blowing agent, and improves the quality and/or mechanical properties.

The introduction of the fibers additionally results in better distribution of the heat owing to the exothermic reaction of the resin system. This reduces heat gradients between the upper and lower sides of the panel. At the same time, the heat is better distributed in the molding volume. Specifically for foams with low heat stability, this gives rise to advantages.

Further improvements/advantages can be achieved in that the fibers are introduced into the blowing agent-containing foam at an angle α in the range from 0° to 60° in relation to the thickness direction (d) of the blowing agent-containing foam, more preferably of 0° to 45°. Generally, the introduction of the fibers at an angle α of 0° to <90° is performable industrially.

Additional improvements/advantages can be achieved when the fibers are introduced into the blowing agent-containing foam not only in a parallel manner, but further fibers are also introduced at an angle β to one another which is preferably in the range from >0 to 180°. This additionally achieves an improvement in the mechanical properties of the molding of the invention.

It is likewise advantageous when the (outer) resin layer in the panels of the invention is applied by liquid injection methods or liquid infusion methods, in which the fibers can be impregnated with resin during processing and the mechanical properties improved. In addition, cost savings are possible.

The present invention is specified further hereinafter.

According to the invention, in the process for producing a molding comprising at least one fiber (F), at least one fiber (F) is introduced into a molding made from blowing agent-containing foam.

In general, the blowing agent-containing foam comprises at least one blowing agent and a foam. The foam may be based on any polymers known to those skilled in the art.

For example, the foam of the blowing agent-containing foam is based on at least one polymer selected from polystyrene, polyester, polyphenylene oxide, a copolymer prepared from phenylene oxide, a copolymer prepared from styrene, polyaryl ether sulfone, polyphenylene sulfide, polyaryl ether ketone, polypropylene, polyethylene, polyamide, polyamide imide, polyether imide, polycarbonate, polyacrylate, polylactic acid, polyvinyl chloride, or a mixture thereof, the polymer preferably being selected from polystyrene, polyphenylene oxide, a mixture of polystyrene and polyphenylene oxide, polyethylene terephthalate, polycarbonate, polyether sulfone, polysulfone, polyether imide, a copolymer prepared from styrene, or a mixture of copolymers prepared from styrene, the polymer more preferably being polystyrene, a mixture of polystyrene and poly(2,6-dimethylphenylene oxide), a mixture of a styrene-maleic anhydride polymer and a styrene-acrylonitrile polymer or a styrene-maleic anhydride polymer (SMA).

Also suitable as foams are thermoplastic elastomers. Thermoplastic elastomers are known as such to those skilled in the art.

Polyphenylene oxide is preferably poly(2,6-dimethylphenylene ether), which is also referred to as poly(2,6-dimethylphenylene oxide).

Suitable copolymers prepared from phenylene are known to those skilled in the art. Suitable comonomers for phenylene oxide are likewise known to those skilled in the art.

A copolymer prepared from styrene preferably has, as comonomer for styrene, a monomer selected from α-methylstyrene, ring-halogenated styrenes, ring-alkylated styrenes, acrylonitrile, acrylic esters, methacrylic esters, N-vinyl compounds, maleic anhydride, butadiene, divinylbenzene and butanediol diacrylate.

The blowing agent-containing foam comprises at least one blowing agent. It may comprise either exactly one blowing agent or two or more blowing agents. The blowing agent-containing foam comprises the maximum blowing agent content on production. "On production" means immediately before the foam expands, i.e. immediately before the desorption of the at least one blowing agent. In other words, in the case of an extruded foam, immediately before exit from the die aperture. The at least one blowing agent diffuses out as a result of diffusion operations during foam expansion, and particularly diffuses out of the foam after production thereof. The maximum blowing agent content on production is typically in the range from 1% to 15% by weight, preferably in the range from 2% to 10% by weight and especially preferably in the range from 3% to 8% by weight of the at least one blowing agent, based on the total weight of the blowing agent-containing foam.

The weight ratio of blowing agent to foam in the blowing agent-containing foam depends on a multitude of factors, for example on the blowing agent, the foamed structure, the foam polymer, the storage conditions and the juncture during the production process.

Suitable blowing agents are known as such to those skilled in the art and are selected, for example, from the group consisting of carbon dioxide, alkanes such as propane, isobutane and pentane, alcohols such as methanol, 1-propanol, 2-propanol, 1-butanol, 2-butanol, 2-methylpropanol and tert-butanol, ethers such as dimethyl ether, ketones such as acetone or methyl ethyl ketones, halogenated hydrocarbons such as hydrofluoropropene, water, nitrogen and mixtures of these.

Preferably, at least one of the blowing agents in the blowing agent-containing foam in the process of the invention fulfills at least one of the following options:

i) at least one of the blowing agents in the blowing agent-containing foam has a boiling point at standard pressure of at least 20° C., preferably at least 35° C. and especially preferably at least 60° C., and/or
ii) at least one of the blowing agents in the blowing agent-containing foam is an organic blowing agent having a molecular weight of at least 30 g/mol, preferably at least 45 g/mol and more preferably at least 55 g/mol.

Preferably, all blowing agents in the blowing agent-containing foam fulfill at least one of the two above-described options.

At least one of the blowing agents in the blowing agent-containing foam has a boiling point of not more than 400° C., preferably of not more than 350° C. and especially preferably of not more than 300° C.

At least one of the blowing agents, preferably each of the blowing agents, in the blowing agent-containing foam thus has for example, a boiling point in the range from 20 to 400° C., preferably in the range from 35 to 350° C., especially preferably in the range from 60 to 200° C.

In a further embodiment, at least one of the blowing agents in the blowing agent-containing foam has a boiling point in the range from −200° C. to 200° C., preferably in the range from −100° C. to 150° C. and especially preferably in the range from −80° C. to 120° C.

The boiling point of the at least one blowing agent is based in each case on the boiling point at standard pressure, i.e. at 1013 mbar.

At least one of the blowing agents is preferably an organic blowing agent having a molecular weight of not more than 200 g/mol, preferably not more than 180 g/mol and especially preferably not more than 150 g/mol and especially 100 g/mol.

At least one of the blowing agents, preferably each of the blowing agents, in the blowing agent-containing foam is thus preferably an organic blowing agent having a molecular weight of 30 to 200 g/mol, preferably in the range from 45 to 180 g/mol, more preferably in the range from 55 to 150 g/mol and most preferably in the range from 55 to 100 g/mol.

In general, at least one of the blowing agents in the blowing agent-containing foam is an organic blowing agent having a molecular weight in the range from 16 to 250 g/mol, more preferably in the range from 30 to 200 g/mol and especially preferably in the range from 46 to 180 g/mol.

Organic blowing agents are known as such to those skilled in the art; for example, the organic blowing agent is selected from the group consisting of alkanes such as propane, isobutane and pentane, alcohols such as methanol, 1-propanol, 2-propanol, 1-butanol, 2-butanol, 2-methylpropanol and tert-butanol, ethers such as dimethyl ether, ketones such as acetone or methyl ethyl ketones, halogenated hydrocarbons such as hydrofluoropropene.

More preferably, the details described above with regard to the boiling point and the molecular weight apply to all blowing agents in the blowing agent-containing foam.

For example, the at least one blowing agent, preferably each of the blowing agents, in the blowing agent-containing foam is selected from the group consisting of sulfur hexafluoride, water, ethane, n-propane, n-butane, n-pentane, n-heptane, isopentane, cyclopentane, cyclohexane, ethanol, propanol, acetone, methyl ethyl ketone, methyl acetate, ethyl acetate, dimethyl ether, n-hexane, n-heptane, furan, tetrahydrofuran, methyl propyl ether, isobutane, methanol, tert-butanol.

Preferably, the at least one blowing agent, preferably each of the blowing agents, in the blowing agent-containing foam is selected from the group consisting of ethane, n-propane, n-butane, n-pentane, n-heptane, isopentane, cyclopentane, cyclohexane, ethanol, propanol, acetone, methyl ethyl ketone, methyl acetate, ethyl acetate, dimethyl ether, n-hexane, n-heptane, furan, tetrahydrofuran, methyl propyl ether, isobutane, methanol, tert-butanol.

More preferably, the at least one blowing agent, preferably each of the blowing agents, in the blowing agent-containing foam is selected from the group consisting of ethane, n-propane, n-butane, n-pentane, n-heptane, isopentane, cyclopentane, cyclohexane, ethanol, propanol, acetone, methyl ethyl ketone, methyl acetate, ethyl acetate, n-hexane, n-heptane, furan, tetrahydrofuran, methyl propyl ether methanol and tert-butanol.

It is also preferable that none of the blowing agents in the blowing agent-containing foam is a halogenated hydrocarbon.

Processes for producing blowing agent-containing foams are known as such to those skilled in the art. For example, the blowing agent-containing foam can be produced in a bead foaming method, an extrusion foaming method, a reactive foaming method and/or a masterbatch foaming method.

The blowing agent-containing foam in that case is, for example, a molded foam, an extruded foam, a reactive foam and/or a masterbatch foam. Preferably, the blowing agent-containing foam is an extruded foam. More particularly, the blowing agent-containing foam is an extruded foam which has been produced in a process comprising the following steps:

I) providing a polymer melt in an extruder,
II) introducing at least one blowing agent into the polymer melt provided in step I) to obtain a foamable polymer melt,
III) extruding the foamable polymer melt obtained in step II) from the extruder through at least one die aperture into an area at lower pressure, with expansion of the foamable polymer melt to obtain an expanded foam,
IV) calibrating the expanded foam from step III) by conducting the expanded foam through a shaping tool to obtain the extruded foam,
V) optional material-removing processing of the extruded foam obtained in step IV),
where
i) the polymer melt provided in step I) optionally comprises at least one additive, and/or
ii) at least one additive is optionally added during step II) to the polymer melt and/or between step II) and step III) to the foamable polymer melt, and/or
iii) at least one additive is optionally applied during step III) to the expanded foam and/or during step IV) to the expanded foam, and/or iv) at least one layer (S2) is optionally applied to the extruded foam during and/or directly after step IV).

Suitable methods for provision of the polymer melt in the extruder in step I) are in principle all methods known to those skilled in the art; for example, the polymer melt can be provided in the extruder by melting an already ready-polymerized polymer. The polymer can be melted directly in the extruder; it is likewise possible to feed the polymer to the extruder in molten form and thus to provide the polymer melt in the extruder in step I). It is likewise possible that the polymer melt is provided in step I) in that the corresponding monomers required for preparation of the polymer of the polymer melt react with one another in the extruder to form the polymer and hence the polymer melt is provided.

A polymer melt is understood in the present context to mean that the polymer is above the melting temperature ($T_M$) in the case of semicrystalline polymers or the glass transition temperature ($T_G$) in the case of amorphous polymers.

Typically, the temperature of the polymer melt in process step I) is in the range from 100 to 450° C., preferably in the range from 150 to 350° C. and especially preferably in the range from 160 to 300° C.

In step II), at least one blowing agent is introduced into the polymer melt provided in step I). Methods for this purpose are known as such to those skilled in the art.

The above-described details and preferences apply to the blowing agent.

In step II), the foamable polymer melt is thus obtained. The foamable polymer melt comprises typically in the range from 1% to 15% by weight of the at least one blowing agent, preferably in the range from 2% to 10% by weight and especially preferably in the range from 3% to 8% by weight, based in each case on the total weight of the foamable polymer melt.

The pressure in the extruder in step II) is typically in the range from 20 to 500 bar, preferably in the range from 50 to 400 bar and especially preferably in the range from 60 to 300 bar.

In step III), the foamable polymer melt obtained in step II) is extruded through at least one die aperture from the extruder into an area at lower pressure, with expansion of the foamable polymer melt to obtain the expanded foam.

Methods of extrusion of the foamable polymer melt are known as such to those skilled in the art.

Suitable die apertures for the extrusion of the foamable polymer melt are all those known to the person skilled in the art. The die aperture may have any desired shape; for example, it may be rectangular, circular, elliptical, square or hexagonal. Preference is given to rectangular slot dies and circular round dies.

In one embodiment, the foamable polymer melt is extruded through exactly one die aperture, preferably through a slot die. In a further embodiment, the foamable polymer melt is extruded through a multitude of die apertures, preferably circular or hexagonal die apertures, to obtain a multitude of strands, the multitude of strands being combined immediately after emergence from the die apertures to form the expanded foam. The multitude of strands can also be combined only in step IV) through the passing through the shaping tool.

Preferably, the at least one die aperture is heated. Especially preferably, the die aperture is heated at least to the glass transition temperature ($T_G$) of the polymer present in the polymer melt provided in step I) when the polymer is an amorphous polymer, and at least to the melting temperature ($T_M$) of the polymer present in the polymer melt provided in step I) when the polymer melt is a semicrystalline polymer; for example, the temperature of the die aperture is in the range from 80 to 400° C., preferably in the range from 100 to 350° C. and especially preferably in the range from 110 to 300° C.

The foamable polymer melt is extruded in step III) into an area at lower pressure. The pressure in the area at lower pressure is typically in the range from 0.05 to 5 bar, preferably in the range from 0.5 to 1.5 bar.

The pressure at which the foamable polymer melt is extruded out of the die aperture in step III) is typically in the range from 20 to 600 bar, preferably in the range from 40 to 300 bar and especially preferably in the range from 50 to 250 bar.

In step IV), the expanded foam from step III) is calibrated by conducting the expanded foam through a shaping tool to obtain the extruded foam.

The calibration of the expanded foam determines the outer shape of the extruded foam obtained in step IV). Methods of calibration are known as such to those skilled in the art.

The shaping tool may be disposed directly at the die aperture. It is likewise possible that the shaping tool is disposed at a distance from the die aperture.

Shaping tools for calibration of the expanded foam are known as such to those skilled in the art. Suitable shaping tools include, for example, sheet calibrators, roller takeoffs, mandrel calibrators, chain takeoffs and belt takeoffs. In order to reduce the coefficient of friction between the tools and the extruded foam, the shaping tools can be coated or heated.

The calibration in step IV) thus fixes the geometric shape of the cross section of the extruded foam of the invention. Preferably, the extruded foam has an orthogonal cross section in at least one dimension. If the calibration is partly undertaken only in particular directions, the extruded foam may depart from the ideal geometry at the free surfaces. The thickness of the extruded foam is determined firstly by the die aperture, and secondly also by the shaping tool; the same applies to the width of the extruded foam.

Suitable methods for material-removing processing, in step V), of the extruded foam obtained in step IV) are in principle all methods known to those skilled in the art. For example, the extruded foam can be subjected to material-removing processing by sawing, milling, drilling or planing.

Based on an orthogonal system of coordinates, the length of the blowing agent-containing foam is referred to as the x direction, the width as the y direction and the thickness as the z direction. The x direction corresponds to the extrusion direction of the extruded foam when it is produced by means of extrusion.

Suitable additives which may be present in the polymer melt in step I) and/or may be added and/or applied to the expanded foam during step II), III) or IV) are in principle any additives known to those skilled in the art, for example nucleating agents, flame retardants, dyes, process stabilizers, processing aids, light stabilizers and pigments.

With regard to layer (S2), which in one embodiment is applied to the extruded foam during and/or after step IV), the details and preferences described further down are applicable.

According to the invention, at least one fiber (F) is introduced into the molding.

The fiber (F) introduced into the molding is a single fiber or a fiber bundle, preferably a fiber bundle. Suitable fibers (F) are all materials known to those skilled in the art that can form fibers. For example, the fiber (F) is an organic, inorganic, metallic or ceramic fiber or a combination thereof, preferably a polymeric fiber, basalt fiber, glass fiber, carbon fiber or natural fiber, especially preferably a polyaramid fiber, glass fiber, basalt fiber or carbon fiber; a polymeric fiber is preferably a fiber of polyester, polyamide, polyaramid, polyethylene, polyurethane, polyvinyl chloride, polyimide and/or polyamide imide; a natural fiber is preferably a fiber of sisal, hemp, flax, bamboo, coconut and/or jute.

In one embodiment, fiber bundles are used. The fiber bundles are composed of several single fibers (filaments). The number of single fibers per bundle is, for example, at least 10, preferably 100 to 100 000 and more preferably 300 to 10 000 in the case of glass fibers and 1000 to 50 000 in the case of carbon fibers, and especially preferably 500 to 5000 in the case of glass fibers and 2000 to 20 000 in the case of carbon fibers.

According to the invention, the at least one fiber (F) is present with a fiber region (FB2) within the molding and is surrounded by the blowing agent-containing foam, while a fiber region (FB1) of the fiber (F) projects from a first side of the molding and a fiber region (FB3) of the fiber (F) projects from a second side of the molding.

The fiber region (FB1), the fiber region (FB2) and the fiber region (FB3) may each account for any desired proportion of the total length of the fiber (F). In one embodiment, the fiber region (FB1) and the fiber region (FB3) each independently account for 1% to 45%, preferably 2% to 40% and more preferably 5% to 30%, and the fiber region (FB2) for 10% to 98%, preferably 20% to 96% and more preferably 40% to 90%, of the total length of the fiber (F).

In a further preferred embodiment, the first side of the molding from which the fiber region (FB1) of the fiber (F) projects is opposite the second side of the molding from which the fiber region (FB3) of the fiber (F) projects.

The fiber (F) has preferably been introduced into the molding at an angle $\alpha$ relative to the thickness direction (d) of the molding or to the orthogonal (of the surface) of the first side of the molding. The angle $\alpha$ may assume any values from 0° to 90°. For example, the fiber (F) has been introduced into the blowing agent-containing foam at an angle $\alpha$ of 0° to 60°, preferably of 0° to 50°, more preferably 0° to 15° or of 10° to 70°, preferably 30° to 60°, more preferably of 30° to 50°, even more preferably of 30° to 45° and especially of 45° relative to the thickness direction (d) of the molding.

In a further embodiment, at least two fibers (F) are introduced at two different angles $\alpha$, $\alpha_1$ and $\alpha_2$, where the angle $\alpha_1$ is preferably in the range from 0° to 15° and the second angle $\alpha_2$ is preferably in the range from 30 to 50°; especially preferably, $\alpha_1$ is in the range from 0° to 5° and $\alpha_2$ in the range from 40 to 50°. Preferably, all fibers (F) in the molding of the invention have the same angle $\alpha$ or at least approximately the same angle (difference of not more than +/_5°, preferably +/_2°, more preferably +/_1°).

Preferably, a molding of the invention comprises a multitude of fibers (F), preferably of fiber bundles, and/or comprises more than 10 fibers (F) or fiber bundles per m², preferably more than 1000 per m², more preferably 4000 to 40 000 per m².

All fibers (F) may be present parallel to one another in the molding. It is likewise possible and preferable in accordance with the invention that two or more fibers (F) are present at an angle $\beta$ to one another in the molding. The angle $\beta$ is understood in the context of the present invention to mean the angle between the orthogonal projection of a first fiber (F1) onto the surface of the first side of the molding and the orthogonal projection of a second fiber (F2) onto the surface of the molding, both fibers having been introduced into the molding.

The angle $\beta$ is preferably in the range of $\beta=360°/n$ where n is an integer. Preferably, n is in the range from 2 to 6, more preferably in the range from 2 to 4. For example, the angle $\beta$ is 90°, 120° or 180°. In a further embodiment, the angle $\beta$ is in the range from 80° to 100°, in the range from 110° to 130° or in the range from 170° to 190°. In a further embodiment, more than two fibers (F) have been introduced at an angle $\beta$ to one another, for example three or four fibers (F). These three or four fibers (F) may each have two different angles $\beta$, $\beta_1$ and $\beta_2$, to the two adjacent fibers. Preferably, all the fibers (F) have the same angles $\beta=\beta_1=\beta_2$ to the two adjacent fibers (F). For example, the angle $\beta$ is 90°, in which case the angle $\beta_1$ between the first fiber (F1) and the second fiber (F2) is 90°, the angle $\beta_2$ between the second fiber (F2) and third fiber (F3) is 90°, the angle $\beta_3$ between the third fiber and fourth fiber (F4) is 90°, and the angle $\beta_4$ between the fourth fiber (F4) and the first fiber (F1) is likewise 90°. The angles $\beta$ between the first fiber (F1) (reference) and the second fiber (F2), third fiber (F3) and fourth fiber (F4) are then, in the clockwise sense, 90°, 180° and 270°. Analogous considerations apply to the other possible angles.

The first fiber (F1) in that case has a first direction, and the second fiber (F2) arranged at an angle $\beta$ to the first fiber (F1) has a second direction. Preferably, there is a similar number of fibers in the first direction and in the second direction. "Similar" in the present context is understood to mean that the difference between the number of fibers in each direction relative to the other direction is <30%, more preferably <10% and especially preferably <2%.

The fibers (F) or fiber bundles may be introduced in irregular or regular patterns. Preference is given to the introduction of fibers or fiber bundles in regular patterns. "Regular patterns" in the context of the present invention is understood to mean that all fibers are aligned parallel to one another and that at least one fiber or fiber bundle has the same distance (a) from all directly adjacent fibers or fiber bundles. Especially preferably, all fibers or fiber bundles have the same distance from all directly adjacent fibers or fiber bundles.

In a further preferred embodiment, the fibers (F) or fiber bundles are introduced such that they, based on an orthogonal system of coordinates, where the thickness direction (d) corresponds to the z direction, each have the same distance from one another $(a_x)$ in the x direction and the same distance $(a_y)$ in the y direction. Especially preferably, they have the same distance (a) in the x direction and in the y direction, where $a=a_x=a_y$.

If two or more fibers (F) are at an angle $\beta$ to one another, the first fibers (F1) that are parallel to one another preferably have a regular pattern with a first distance $(a_1)$, and the second fibers (F2) that are parallel to one another and are at an angle $\beta$ to the first fibers (F1) preferably have a regular pattern with a second distance $(a_2)$. In a preferred embodiment, the first fibers (F1) and the second fibers (F2) each have a regular pattern with a distance (a). In that case, $a=a_1=a_2$.

If fibers or fiber bundles are introduced into the foam at an angle $\beta$ to one another, it is preferable that the fibers or fiber bundles follow a regular pattern in each direction.

FIG. 1 shows a schematic diagram of a preferred embodiment of the molding produced in accordance with the invention made from blowing agent-containing foam (1) in a perspective view. (2) represents (the surface of) a first side of the molding, while (3) represents a second side of the corresponding molding. As further apparent from FIG. 1, the first side (2) of the molding is opposite the second side (3) of this molding. The fiber (F) is represented by (4). One end of this fiber (4a) and hence the fiber region (FB1) projects from the first side (2) of the molding, while the other end (4b) of the fiber, which constitutes the fiber region (FB3), projects from the second side (3) of the molding. The middle fiber region (FB2) is within the molding and is thus surrounded by the foam.

In FIG. 1, the fiber (4) which is, for example, a single fiber or a fiber bundle, preferably a fiber bundle, is at an angle α relative to the thickness direction (d) of the molding or to the orthogonal (of the surface) of the first side (2) of the molding. The angle α may assume any values from 0° to 90°, and is normally 0° to 60°, preferably 0° to 50°, more preferably 0° to 15° or 10° to 70°, preferably 30° to 60°, more preferably 30° to 50°, very particularly 30° to 45°, especially 45°. For the sake of clarity, FIG. 1 shows just a single fiber (F).

Figure 3:
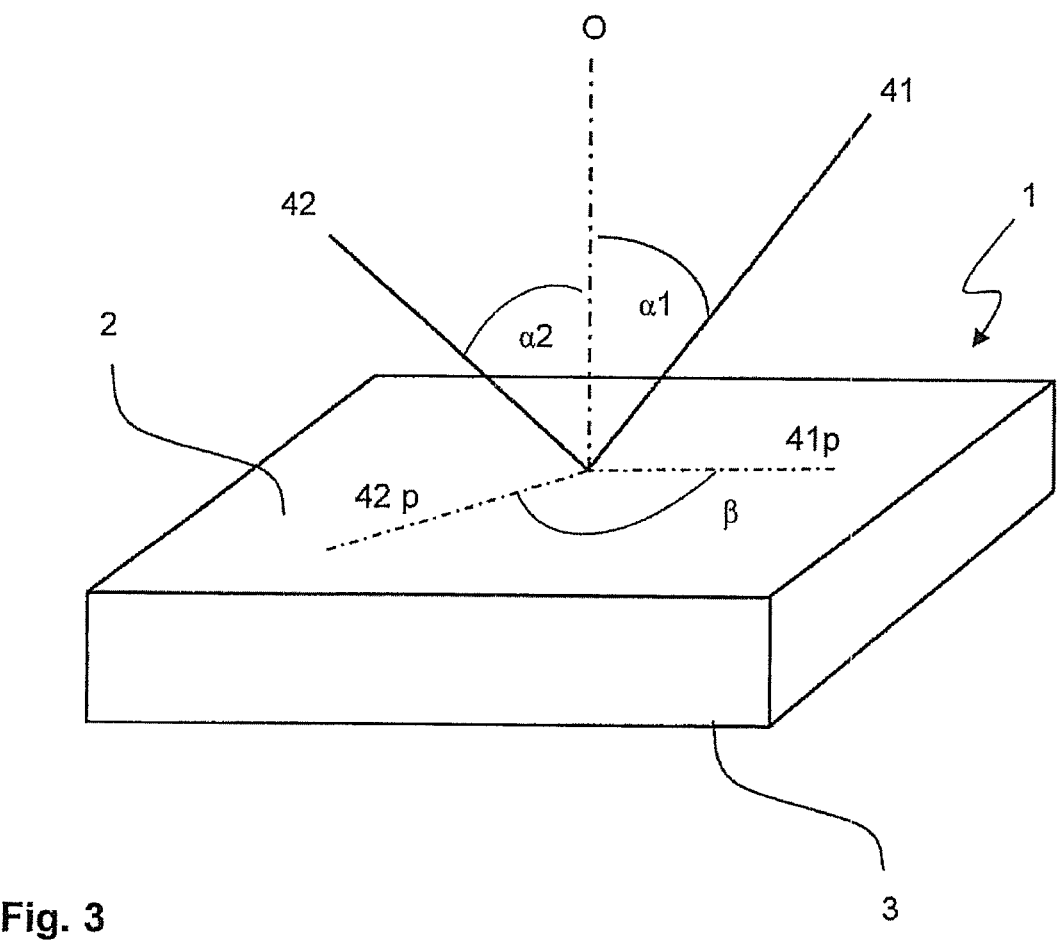
FIG. 3 shows, by way of example, a schematic diagram of some of the different angles.

FIG. 3 shows, by way of example, a schematic diagram of some of the different angles. The molding made from blowing agent-containing foam (1) shown in FIG. 3 comprises a first fiber (41) and a second fiber (42). In FIG. 3, for better clarity, only the fiber region (FB1) that projects from the first side (2) of the molding is shown for the two fibers (41) and (42). The first fiber (41) forms a first angle α (α1) relative to the orthogonal (O) of the surface of the first side (2) of the molding. The second fiber (42) forms a second angle α (α2) relative to the orthogonal (O) of the surface of the first side (2). The orthogonal projection of the first fiber (41) onto the first side (2) of the molding (41p) forms the angle β with the orthogonal projection of the second fiber (42) onto the first side (2) of the molding (42p).

Suitable processes for production of the molding comprising at least one fiber (F) include in principle all methods known to those skilled in the art. Suitable processes are described, for example, in WO 2006/125561 or in WO 2011/012587.

For example, the at least one fiber (F) is partially introduced into the blowing agent-containing foam in the process of the invention by sewing it in using a needle, preference being given to effecting the partial introduction by steps a) to f):
a) optionally applying at least one layer (S2) to at least one side of the blowing agent-containing foam,
b) producing one hole per fiber (F) in the blowing agent-containing foam and in any layer (S2), the hole extending from a first side to a second side of the blowing agent-containing foam and through any layer (S2),
c) providing at least one fiber (F) on the second side of the blowing agent-containing foam,
d) passing a needle from the first side of the blowing agent-containing foam through the hole to the second side of the blowing agent-containing foam, and passing the needle through any layer (S2),
e) securing at least one fiber (F) on the needle on the second side of the blowing agent-containing foam, and
f) returning the needle along with the fiber (F) through the hole, such that the fiber (F) is present with the fiber region (FB2) within the molding and is surrounded by the foam, while the fiber region (FB1) of the fiber (F) projects from a first side of the molding or any layer (S2) and the fiber region (FB3) of the fiber (F) projects from a second side of the molding,
more preferably with simultaneous performance of steps b) and d).

The application of at least one layer (S2) in step a) can be effected, for example, as described above during and/or directly after step IV).

In a particularly preferred embodiment, steps b) and d) are performed simultaneously. In this embodiment, the hole from the first side to the second side of the blowing agent-containing foam is produced by the passing of a needle from the first side of the blowing agent-containing foam to the second side of the blowing agent-containing foam.

In this embodiment, the introduction of the at least one fiber (F) may comprise, for example, the following steps:
a) optionally applying a layer (S2) to at least one side of the blowing agent-containing foam,
b) providing at least one fiber (F) on the second side of the blowing agent-containing foam,
c) producing one hole per fiber (F) in the blowing agent-containing foam and in any layer (S2), the hole extending from the first side to a second side of the blowing agent-containing foam and through any layer (S2), and the hole being produced by the passing of a needle through the blowing agent-containing foam and through any layer (S2),
d) securing at least one fiber (F) on the needle on the second side of the blowing agent-containing foam,
e) returning the needle along with the fiber (F) through the hole, such that the fiber (F) is present with the fiber region (FB2) within the molding and is surrounded by the blowing agent-containing foam, while the fiber region (FB1) of the fiber (F) projects from a first side of the molding or from any layer (S2) and the fiber region (FB3) projects from a second side of the molding,
f) optionally cutting off the fiber (F) on the second side and
g) optionally cutting open the loop of the fiber (F) formed at the needle.

In a preferred embodiment, the needle used is a hook needle and at least one fiber (F) is hooked in in the hook needle in step d).

In a further preferred embodiment, a plurality of fibers (F) are introduced simultaneously into the blowing agent-containing foam according to the steps described above.

The process of the invention is preferably conducted when the blowing agent-containing foam of the molding at the time of partial introduction of at least one fiber (F) still comprises at least 5% by weight, preferably at least 10% by weight, more preferably at least 25% by weight and most preferably at least 50% by weight of the amount of at least one blowing agent, preferably of all blowing agents, based on the amount of the at least one blowing agent, preferably of all blowing agents, which were used for production of the blowing agent-containing foam.

It is also preferable that the process of the invention is conducted when the blowing agent-containing foam of the molding at the time of partial introduction of at least one fiber (F) still comprises not more than 100% by weight, preferably not more than 99% by weight and more preferably not more than 95% by weight of the amount of at least one blowing agent, preferably of all blowing agents, based on the amount of the at least one blowing agent, preferably of all blowing agents, which were used for production of the blowing agent-containing foam.

The "amount of all blowing agents" is based on all blowing agents present in the blowing agent-containing foam. Thus, if the blowing agent-containing foam comprises exactly one blowing agent, the amount of blowing agent is based on exactly one blowing agent. By contrast, if the blowing agent-containing foam comprises two or more blowing agents, the amount of blowing agent is based on two or more blowing agents.

Several methods are available for the determination of blowing agent content. Given adequate thermal stability of the foam used, it is possible, by thermogravimetric analysis (TGA), to heat the foam until desorption of all blowing agents is complete. The loss of mass then corresponds to the amount of blowing agent still present in the foam.

For the analysis of individual blowing agents, it is possible to utilize the following processes, for example: For the analysis of individual organic blowing agents, it is possible to employ headspace gas chromatography, for example. The samples are dissolved in a solvent and the amount and type of blowing agent are ascertained by quantitative chromatography. Processes for this purpose are known to those skilled in the art. In the case of use of water as blowing agent, it is possible to determine the water content by coulometric Karl Fischer titration.

It is also preferable that the process of the invention is conducted when the blowing agent-containing foam of the molding at the time of partial introduction of at least one fiber (F) still comprises at least one of the blowing agents to an extent of more than 20% by weight, preferably to an extent of more than 50% by weight and especially preferably to an extent of more than 70% by weight, based on the amount of the at least one blowing agent which is present in the blowing agent-containing foam at the time of completion of the blowing agent-containing foam.

It is also preferable that the process of the invention is conducted when the blowing agent-containing foam of the molding at the time of partial introduction of at least one fiber (F) still comprises not more than 100% by weight, preferably not more than 99% by weight and more preferably not more than 95% by weight of the amount of at least one blowing agent, based on the amount of the at least one blowing agent which is present in the blowing agent-containing foam at the time of completion of the blowing agent-containing foam.

If more than one blowing agent is present in the foam, this means that at least one of these blowing agents is still present to an extent of more than 20% by weight, preferably to an extent of more than 50% by weight and especially preferably to an extent of more than 70% by weight. The further blowing agents may also be present in smaller amounts.

It is further preferable that the partial introduction of at least one fiber (F) into the blowing agent-containing foam is effected after no later than twelve weeks, preferably after no later than six weeks, more preferably after no later than three weeks, especially 48 hours, and especially after no later than 2 hours, based on the juncture of completion of the blowing agent-containing foam.

It is further preferable irrespective of the amount of blowing agent that the partial introduction of at least one fiber (F) into the blowing agent-containing foam is effected prior to expiry of the stabilization time, preferably no later than after expiry of half the stabilization time, more preferably no later than after expiry of a quarter of the stabilization time, based on the stabilization time of the straight foam.

Preferably, the process of the invention also fulfills at least one of the following options:
i) the desorption of at least one blowing agent of the blowing agent-containing foam of the molding, preferably of all blowing agents of the blowing agent-containing foam of the molding, as a result of the introduction of the fiber (F), is increased by at least a factor of 1.2, preferably by at least a factor of 1.5, more preferably by at least a factor of 2.0 and especially preferably by at least a factor of 3.0 compared to a blowing agent-containing foam without fibers, and/or
ii) the stabilization time of the blowing agent-containing foam, as a result of the introduction of the at least one fiber (F), is reduced by at least a factor of 1.2, preferably by at least a factor of 1.5, more preferably by at least a factor of 2.0 and especially preferably by at least a factor of 3.0 compared to a blowing agent-containing foam without fibers.

In general, the desorption of at least one blowing agent of the blowing agent-containing foam of the molding, preferably of all blowing agents of the blowing agent-containing foam of the molding, as a result of the introduction of the fiber (F), is increased by not more than a factor of 10 000 000, preferably by not more than a factor of 100 000, more preferably by not more than a factor of 1000 and especially preferably by not more than a factor of 100 compared to a blowing agent-containing foam without fibers.

The "desorption of at least one blowing agent" in the present context is understood to mean the exchange of the at least one blowing agent present in the blowing agent-containing foam for air from the environment. As a result of the desorption of the at least one blowing agent, the at least one blowing agent present in the foam is thus replaced by air, such that the blowing agent-containing foam comprises increasingly less blowing agent and more air.

The desorption of the at least one blowing agent is measured by the above-described methods of blowing agent analysis. For this purpose, the blowing agent content of the foams is determined prior to the production of the moldings. A portion of the foam is subsequently processed to give the molding of the invention; the other portion is stored under identical ambient conditions as a reference specimen. The amount of blowing agent is determined in both foams after discrete periods of time. This shows the distinctly more rapid desorption from the molding in accordance with the invention compared to the untreated reference sample. For the assessment of the elevated desorption factor, measurement is required within the first two weeks after the introduction of the fibers (F). Said factor is based on any juncture within this period.

In general, the stabilization time of the blowing agent-containing foam, as a result of the introduction of the at least one fiber (F), is reduced by not more than a factor of 1000, preferably by not more than a factor of 500, more preferably by not more than a factor of 200 and especially preferably by not more than a factor of 100 compared to a blowing agent-containing foam without fiber.

Stabilization time is understood to mean the period of time between the production of the foam and the earliest juncture required for adequate dimensional stability of the foam under thermal stress. At the later processing or use temperature of the foam, the geometric dimensions of the foam generally have to remain virtually constant. For example, there must be no occurrence of any significant changes in the thickness, length and width. Moreover, other deformations such as local or global sink marks, bulges and collapses should be avoided.

To determine the dimensional stability, the foam of defined size (for example slabs having a width of 500 mm and a length of 1 m) are stored in a heated cabinet at constant temperature for several hours (for example several hours to days). Subsequently, the slab geometries are determined and compared with the state prior to the heated storage. In many cases, for example, changes in dimensions of more than 3% in the different spatial directions are impermissible; in addition, bulges and sink marks should be avoided. The exact conditions depend on the later end use of the foam or the molding.

In all cases, the stabilization time describes the period of time required for attainment of adequate stabilization after foam production. According to the density, thickness, structure and formulation of blowing agent-foamed foams, the period of time may vary within the range from a few seconds to several months. This is especially true in the case of use of organic blowing agents that exert a plastifying effect on the foam.

The present invention also provides a molding produced by the process of the invention.

The present invention also provides a panel comprising at least one molding produced in accordance with the invention and at least one layer (S1). A "panel" may in some cases also be referred to among specialists as "sandwich", "sandwich material", "laminate" and/or "composite article".

In a preferred embodiment of the panel, the panel has two layers (S1), and the two layers (S1) are each mounted on a side of the molding opposite the respective other side in the molding.

In one embodiment of the panel of the invention, the layer (S1) comprises at least one resin, the resin preferably being a reactive thermoset or thermoplastic resin, the resin more preferably being based on epoxides, acrylates, polyurethanes, polyamides, polyesters, unsaturated polyesters, vinyl esters or mixtures thereof, and the resin especially being an amine-curing epoxy resin, a latently curing epoxy resin, an anhydride-curing epoxy resin or a polyurethane formed from isocyanates and polyols. Resin systems of this kind are known to those skilled in the art, for example from Penczek et al. (Advances in Polymer Science, 184, p. 1-95, 2005), Pham et al. (Ullmann's Encyclopedia of Industrial Chemistry, vol. 13, 2012), Fahnler (Polyamide, Kunststoff Handbuch 3/4, 1998) and Younes (WO12134878 A2).

Preference is also given in accordance with the invention to a panel in which
i) the fiber region (FB1) of the fiber (F) is in partial or complete contact, preferably complete contact, with the first layer (S1), and/or
ii) the fiber region (FB3) of the fiber (F) is in partial or complete contact, preferably complete contact, with the second layer (S1), and/or
iii) the panel has at least one layer (S2) between at least one side of the molding and at least one layer (S1), the layer (S2) preferably being composed of two-dimensional fiber materials or polymeric films, more preferably of glass fibers or carbon fibers in the form of webs, scrims or weaves.

In a further inventive embodiment of the panel, the at least one layer (S1) additionally comprises at least one fibrous material, wherein
i) the fibrous material comprises fibers in the form of one or more laminas of chopped fibers, webs, scrims, knits and/or weaves, preferably in the form of scrims or weaves, more preferably in the form of scrims or weaves having a basis weight per scrim or weave of 150 to 2500 g/m$^2$, and/or
ii) the fibrous material comprises fibers of organic, inorganic metallic or ceramic fibers, preferably polymeric fibers, basalt fibers, glass fibers, carbon fibers or natural fibers, more preferably glass fibers or carbon fibers.

The details described above are applicable to the natural fibers and the polymeric fibers.

A layer (S1) additionally comprising at least one fibrous material is also referred to as a fiber-reinforced layer, especially as a fiber-reinforced resin layer if the layer (S1) comprises a resin.

Figure 2:
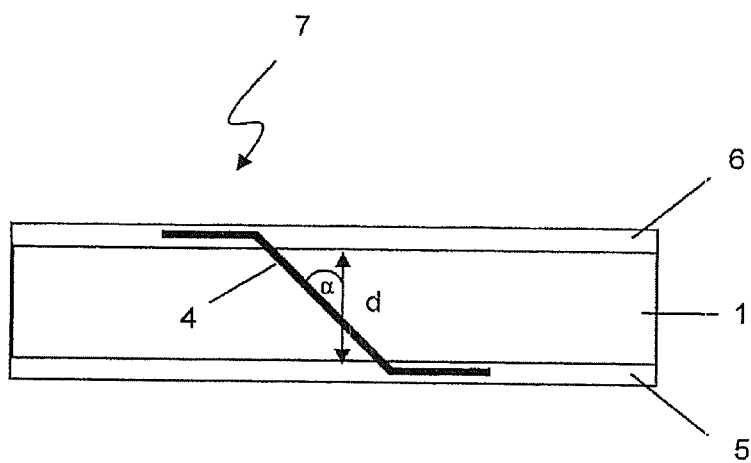
FIG. 2 shows a further embodiment of the described invention.

FIG. 2 shows a further preferred embodiment of the present invention. A two-dimensional side view of a panel (7) of the invention is shown, comprising a molding (1) produced in accordance with the invention, as detailed above, for example, within the context of the embodiment of FIG. 1. Unless stated otherwise, the reference numerals have the same meaning in the case of other abbreviations in FIGS. 1 and 2.

In the embodiment according to FIG. 2, the panel of the invention comprises two layers (S1) represented by (5) and (6). The two layers (5) and (6) are each on mutually opposite sides of the molding (1). The two layers (5) and (6) are preferably resin layers or fiber-reinforced resin layers. As is further apparent from FIG. 2, the two ends of the fibers (4) are surrounded by the respective layers (5) and (6).

It is optionally possible for one or more further layers to be present between the molding (1) and the first layer (5) and/or between the molding (1) and the second layer (6). As described above for FIG. 1, FIG. 2 also shows, for the sake of simplicity, a single fiber (F) with (4). With regard to the number of fibers or fiber bundles, in practice, analogous statements apply to those detailed above for FIG. 1.

The present invention further provides a process for producing the panel of the invention, in which the at least one layer (S1) in the form of a reactive viscous resin is applied to a molding of the invention and cured, preferably by liquid impregnation methods, more preferably by pressure- or vacuum-assisted impregnation methods, especially preferably by vacuum infusion or pressure-assisted injection methods, most preferably by vacuum infusion. Liquid impregnation methods are known as such to those skilled in the art and are described in detail, for example, in Wiley Encyclopedia of Composites (2nd Edition, Wiley, 2012), Parnas et al. (Liquid Composite molding, Hanser, 2000) and Williams et al. (Composites Part A, 27, p. 517-524, 1997).

Various auxiliary materials can be used for production of the panel of the invention. Suitable auxiliary materials for production by vacuum infusion are, for example, vacuum film, preferably made from nylon, vacuum sealing tape, flow aids, preferably made from nylon, separating film, preferably made from polyolefin, tearoff fabric, preferably made from polyester, and a semipermeable film, preferably a membrane film, more preferably a PTFE membrane film, and absorption fleece, preferably made from polyester. The choice of suitable auxiliary materials is guided by the component to be manufactured, the process chosen and the materials used, specifically the resin system. In the case of use of resin systems based on epoxide and polyurethanes, preference is given to using flow aids made from nylon, separation films made from polyolefin, tearoff fabric made from polyester, and semipermeable films as PTFE membrane films, and absorption fleeces made from polyester.

These auxiliary materials can be used in various ways in the process for producing the panel of the invention. Panels are more preferably produced from the moldings by applying fiber-reinforced outer plies by means of vacuum infusion. In a typical construction, for production of a panel of the invention, fibrous materials and optionally further layers are applied to the upper and lower sides of the molding. Subsequently, tearoff fabric and separation films are positioned. In the infusion of the liquid resin system, it is possible to work with flow aids and/or membrane films. Particular preference is given to the following variants:

i) use of a flow aid on just one side of the construction, and/or
ii) use of a flow aid on both sides of the construction, and/or
iii) construction with a semipermeable membrane (VAP construction); the latter is preferably draped over the full area of the molding, on which flow aids, separation film and tearoff fabric are used on one or both sides, and the semipermeable membrane is sealed with respect to the mold surface by means of vacuum sealing tape, the absorption fleece is inserted on the side of the semipermeable membrane remote from the molding, as a result of which the air is evacuated upward over the full area, and/or
iv) use of a vacuum pocket made from membrane film, which is preferably positioned at the opposite gate side of the molding, by means of which the air is evacuated from the opposite side to the gate.

The construction is subsequently equipped with gates for the resin system and gates for the evacuation. Finally, a vacuum film is applied over the entire construction and sealed with sealing tape, and the entire construction is evacuated. After the infusion of the resin system, the reaction of the resin system takes place with maintenance of the vacuum.

The present invention also provides for the use of the molding produced in accordance with the invention or of the panel produced in accordance with the invention for rotor blades in wind turbines, in the transport sector, in the construction sector, in automobile construction, in shipbuilding, in rail vehicle construction, for container construction, for sanitary installations and/or in aerospace.

The invention claimed is:

1. A process for producing a molding comprising at least one fiber (F), which comprises partially introducing at least one fiber (F) into a molding made of blowing agent-containing foam in said blowing agent-containing foam, as a result of which the fiber (F) is present with a fiber region (FB2) within the molding and is surrounded by the blowing agent-containing foam, while a fiber region (FB1) of the fiber (F) projects out of a first side of the molding and a fiber region (FB3) of the fiber (F) projects out of a second side of the molding, where the molding comprises more than 1000 fibers (F) per m$^2$, and wherein the blowing agent-containing foam of the molding at the time of partial introduction of at least one fiber (F) still comprises at least 5% by weight of the amount of at least one blowing agent, based on the amount of the at least one blowing agent which is used for production of the blowing agent-containing foam.

2. The process according to claim 1, wherein the blowing agent-containing foam of the molding at the time of partial introduction of at least one fiber (F) still comprises at least 10% by weight, of the amount of at least one blowing agent, based on the amount of the at least one blowing agent, which is/are used for production of the blowing agent-containing foam.

3. The process according to claim 1, wherein at least one of the blowing agents in the blowing agent-containing foam
   i) has a boiling point at standard pressure of at least 20° C., or
   ii) is an organic blowing agent having a molecular weight of at least 30 g/mol.

4. The process according to claim 1, wherein
   i) the desorption of at least one blowing agent in the blowing agent-containing foam of the molding, as a result of the introduction of the fiber (F), is increased by at least a factor of 1.2, or
   ii) the stabilization time of the blowing agent-containing foam, as a result of the introduction of the at least one fiber (F), is reduced by at least a factor of 1.2, compared to a blowing agent-containing foam without fibers.

5. The process according to claim 1, wherein the blowing agent-containing foam is a molded foam, an extruded foam, a reactive foam or a masterbatch foam that has been produced in a process comprising the following steps:
   I) providing a polymer melt in an extruder,
   II) introducing at least one blowing agent into the polymer melt provided in step I) to obtain a foamable polymer melt,
   III) extruding the foamable polymer melt obtained in step II) from the extruder through at least one die aperture into an area at lower pressure, with expansion of the foamable polymer melt to obtain an expanded foam,
   IV) calibrating the expanded foam from step III) by conducting the expanded foam through a shaping tool to obtain the extruded foam,
   V) optional material-removing processing of the extruded foam obtained in step IV), where
   i) the polymer melt provided in step I) optionally comprises at least one additive, or
   ii) at least one additive is optionally added during step II) to the polymer melt or between step II) and step III) to the foamable polymer melt, or
   iii) at least one additive is optionally applied during step III) to the expanded foam or during step IV) to the expanded foam, or
   iv) ate least one layer (S2) is optionally applied to the extruded foam during or directly after step IV).

6. The process according to claim 1, wherein the foam of the blowing agent-containing foam is based on at least one polymer selected from polystyrene, polyester, polyphenylene oxide, a copolymer prepared from phenylene oxide, a copolymer prepared from styrene, polyaryl ether sulfone, polyphenylene sulfide, polyaryl ether ketones, polypropylene, polyethylene, polyamide, polyamide imide, polyether imide, polycarbonate, polyacrylates, polylactic acid, polyvinyl chloride, thermoplastic elastomers, or a mixture thereof.

7. The process according to claim 1, wherein
   i) the fiber (F) is a single fiber or a fiber bundle, or
   ii) the fiber (F) is an organic, inorganic, metallic or ceramic fiber, or
   iii) the fiber (F) is used in the form of a fiber bundle having a number of single fibers per bundle of at least 10, in the case of glass fibers and 1000 to 50 000 in the case of carbon fibers, or iv) the fiber region (FB1) and the fiber region (FB3) each independently account for 1% to 45%, and the fiber region (FB2) for 10% to 98%, of the total length of a fiber (F).

8. The process according to claim 1, wherein
   i) the fiber (F) has been introduced into the blowing agent-containing foam at an angle α of 0° to 60° relative to the thickness direction (d) of the molding, or
   ii) in the molding, the first side of the molding from which the fiber region (FB1) of the fiber (F) projects is opposite the second side of the molding from which the fiber region (FB3) of the fiber (F) projects, or
   iii) the molding comprises 4000 to 40 000 fibers (F) per m$^2$.

9. The process according to claim 1, wherein the at least one fiber (F) is partially introduced into the blowing agent-containing foam by sewing it in using a needle, the partial introduction being effected by means of steps a) to f):

a) optionally applying at least one layer (S2) to at least one side of the blowing agent-containing foam,
b) producing one hole per fiber (F) in the blowing agent-containing foam and in any layer (S2), the hole extending from a first side to a second side of the blowing agent-containing foam and through any layer (S2),
c) providing at least one fiber (F) on the second side of the blowing agent-containing foam,
d) passing a needle from the first side of the blowing agent-containing foam through the hole to the second side of the blowing agent-containing foam, and passing the needle through any layer (S2),
e) securing at least one fiber (F) on the needle on the second side of the blowing agent-containing foam, and
f) returning the needle along with the fiber (F) through the hole, such that the fiber (F) is present with the fiber region (FB2) within the molding and is surrounded by the blowing agent-containing foam, while the fiber region (FB1) of the fiber (F) projects from a first side of the molding or from any layer (S2) and the fiber region (FB3) of the fiber (F) projects from a second side of the molding.

10. A molding produced by the process according to claim 1.

11. A panel comprising at least one molding according to claim 10 and at least one layer (S1).

12. The molding according to claim 10 for rotor blades in wind turbines, in the transport sector, in the construction sector, in automobile construction, in shipbuilding, in rail vehicle construction, for container construction, for sanitary installations or in aerospace.

13. The panel according to claim 11, wherein the layer (S1) comprises at least one resin.

14. The panel according to claim 13, wherein the resin being based on epoxides, acrylates, polyurethanes, polyamides, polyesters, unsaturated polyesters, vinyl esters or mixtures thereof.

15. The panel according to claim 11, wherein the layer (S1) additionally comprises at least one fibrous material, where
   i) the fibrous material comprises fibers in the form of one or more laminas of chopped fibers, webs, scrims, knits or weaves, or
   ii) the fibrous material comprises organic, inorganic, metallic or ceramic fibers.

16. The panel according to claim 11, wherein the panel has two layers (S1) and the two layers (S1) are each mounted on a side of the molding opposite the respective other side in the molding.

17. The panel according to claim 11, wherein
   i) the fiber region (FB1) of the fiber (F) is in partial or complete contact, or
   ii) the fiber region (FB3) of the fiber (F) is in partial or complete contact, with the second layer (S1), or
   iii) the panel has at least one layer (S2) between at least one side of the molding and at least one layer (S1).

18. The panel according to claim 17, wherein the layer (S2) being composed of two-dimensional fiber materials or polymeric films.

19. A process of producing a panel, which comprises:
   producing a molding by the process according to claim 1;
   producing, applying and curing at least one layer (S1) in the form of a reactive viscous resin on the molding.

* * * * *